United States Patent Office 3,448,144
Patented June 3, 1969

3,448,144
PREPARATION OF TRANS-4-AMINOMETHYL-
CYCLOHEXANE-1-CARBOXYLIC ACID
Atsuji Okano and Reimei Moroi, Tokyo, and Takeo Naito, Ichikawa-shi, Japan, assignors to Daiichi Seiyaku Company Limited of Japan, and Mitsubishi Chemical Industries Limited of Japan, both corporations of Japan
No Drawing. Filed Mar. 24, 1966, Ser. No. 536,992
Claims priority, application Japan, Apr. 13, 1965, 40/21,401
Int. Cl. C07c 99/12
U.S. Cl. 260—514     7 Claims

ABSTRACT OF THE DISCLOSURE

A process for separation of the trans-isomer from the cis-isomer of 4-aminomethylcyclohexane-1-carboxylic acid from a mixture thereof which comprises treating the mixture in water with p-toluenesulfonic acid to form sulfonates of the isomers, separating the two p-toluenesulfonates from each other by solubility differences thereof and liberating trans-4-aminomethylcyclohexane-1-carboxylic acid from the separated p-toluenesulfonate of the trans isomer.

---

This invention relates to the preparation of pure trans-4-aminomethylcyclohexane-1-carboxylic acid, and more specifically to the separation of trans-4-aminomethylcyclohexane-1-carboxylic acid from stereoisomeric mixtures of cis- and trans - 4-aminomethylcyclohexane-1-carboxylic acid.

4-aminomethylcyclohexane-1-carboxylic acid has been known as a valuable substance for pharmaceutical use, and it is specifically pointed out in Belgian Patent No. 617,216 that the compound has an antiplasmic effect and a therapeutic effect on disorders caused by the activated plasmin in vivo.

The inventors have investigated the stereoisomers of 4-amino-methylcyclohexane-1-carboxylic acid and found that the trans stereoisomer is far more potent in its antiplasmic effect than the cis stereoisomer. The inventors have developed various synthetic methods for the preparation of this valuable compound, the trans stereoisomer, and filed applications for patents in connection therewith (U.S. application Ser. Nos. 418,325, 435,074 and 451,045, now Patent No. 3,361,700, which are made a part hereof by reference).

4-aminomethylcyclohexane-1-carboxylic acid prepared by various known methods and by some of the procedures described above, however, consists of both cis and trans-stereoisomers in varying proportions. The reasonably pure trans stereoisomer may be obtained by fractional recrystallizations of the mixture which are accompanied with a significant loss in the yield.

It has been, therefore desirable to develop an economically attractive method for the separation of trans-4-aminomethylcyclohexane-1-carboxylic acid from cis-4-aminomethylcyclohexane-1-carboxylic acid.

It is accordingly an object of the present invention to provide a method for the preparation of pure trans-4-aminomethylcyclohexane-1-carboxylic acid by the separation thereof from a mixture containing both the cis and trans isomer forms of 4-aminomethylcyclohexane-1-carboxylic acid.

It is a further object of the present invention to provide such a process which is simple, economical and efficient.

It is still a further object of this invention to provide a method for the preparation of pure trans-4-aminomethylcyclohexane-1-carboxylic acid which involves the separation thereof from crude trans-4-aminomethylcyclohexane-1-carboxylic acid containing cis-4-aminomethylcyclohexane-1-carboxylic acid.

Still further objects and advantages of the present invention will become apparent from the detailed description given hereinafter. It should be understood, however, that the detailed description and specific examples, while indicating preferred embodiments, are given by way of illustration only, since various changes and modifications within the spirit and scope of the invention will become apparent to those skilled in the art.

The above objects are accomplished according to this invention by treating an isomeric mixture of cis- and trans-4-aminomethylcyclohexane-1-carboxylic acid with p-toluenesulfonic acid whereupon the trans form of 4-aminomethylcyclohexane-1-carboxylic acid is separated as a p-toluenesulfonate followed by liberating the free trans-4-aminomethylcyclohexane-1-carboxylic acid from the p-toluenesulfonate.

In accordance with the present invention, the isomeric mixture of cis- and trans-4-aminomethylcyclohexane-1-carboxylic acid are separated into the corresponding p-toluenesulfonates regardless of the relative amounts of the two stereoisomers.

To describe in more detail, an aqueous solution of p-toluenesulfonic acid is added to a solution of stereoisomeric mixtures of cis- and trans-4-aminomethylcyclohexane-1-carboxylic acid in water or a mixture of water and water-miscible organic solvent such as methanol, ethanol, isopropanol or acetone and the solution is allowed to stand, whereupon only the p-toluenesulfonate of the trans-4-aminomethylcyclohexane-1-carboxylic acid, having a melting point of 262–264° C., is crystallized from the solution, while the p-toluenesulfonate of the cis-4-aminomethylcyclohexane-1-carboxylic acid remains dissolved in the mother liquor. As a result, the p-toluenesulfonates of the two stereoisomers can be easily separated by conventional means, such as filtration, decantation, centrifuging, etc. The p-toluenesulfonate of cis-4-aminomethylcyclohexane-1-carboxylic acid can be obtained as crystals which melt at 177–178° C., from the concentrated mother liquor.

However, in case a small quantity only of the cis stereoisomer is present in the mixture, the mother liquor separated from the first precipitated crystals is concentrated to obtain a second crop of crystals of p-toluenesulfonate of the trans stereoisomer, and then the p-toluenesulfonate of the cis stereoisomer is obtained from the second mother liquor.

The p-toluenesulfonates of the two stereoisomers can be transformed into the free stereoisomers in the same manner, respectively, by the use of a basic compound, for example, an alkali, hydrazine or organic amine such as primary, secondary or tertiary alkyl amines, cyclohexylamine or dicyclohexylamine, or an ion-exchange resin such as weakly basic ion-exchange resin or strongly acidic ion-exchange resin. For example, when a solution of the p-toluenesulfonate is passed through a column of weakly basic ion-exchange resin (OH type), p-toluenesulfonic acid is adsorbed by the resin and the desired free base is obtained from the eluate. When the solution of the p-toluenesulfonate is passed through a column of strongly acidic ion-exchange resin, p-toluenesulfonic acid passes through the column to be recovered and the desired free base is adsorbed by the resin to be obtained by the following elution with ammonia water.

When an alkali or an organic base is employed, an aqueous solution of the p-toluenesulfonate is mixed with an aqueous or an alcoholic solution of an alkali or an organic base. Thereby p-toluenesulfonate of the alkali or base and the trans- or cis-4-aminomethylcyclohexane-1-carboxylic acid formed are separated from each other by the difference of the solubilities in the solvent.

The solution of a mixture of trans- and cis-4-aminomethylcyclohexene-1-carboxylic acid employed as a starting material in the present invention may be that prepared by dissolving mixed crystals of trans- and cis-stereoisomer or that obtained in the course of preparation of 4-aminomethylcyclohexane-1-carboxylic acid.

So the reaction mixture obtained by the methods of preparation disclosed in U.S. application Ser. Nos. 418,325, 435,074 and 451,045 can be directly subjected to the separation of the present invention to conveniently afford pure trans-4-amino - methylcyclohexane - 1-carboxylic acid. That is, the reaction mixture which can be directly subjected to the process of the present invention is that obtained in accordance with the method described in U.S. application Ser. No. 451,045 by catalytically reducing a salt selected from the group consisting of an alkali and alkaline earth metal salt of 4-N-acetamidomethylbenzoic acid by heating in an autoclave at 120–200° C. in a solvent selected from the group consisting of water, an aliphatic lower alcohol and a mixture thereof in the presence of Raney-nickel catalyst in an atmosphere of hydrogen, the initial pressure of which is about 40–100 atmospheres pressure, to produce the corresponding salt of 4-N-acetamidomethylcyclohexane - 1-carboxylic acid; heating in an autoclave the product obtained above at 180–250° C. for about 8–16 hours with an aqueous solution of an alkali selected from the group consisting of an alkali metal hydroxide, an alkaline earth metal oxide and hydroxide.

The reaction mixture which can be employed in the present invention may also be that obtained in accordance with the method described in U.S. application Ser. No. 435,074 by heating a member selected from the group consisting of cis-4-aminomethylcyclohexane-1-carboxylic acid and/or a mixture of cis- and trans-4-aminomethylcyclohexane-1-carboxylic acid at a temperature of between about 160° C. and 250° C. in water in the presence of alkali metal hydroxides or alkaline earth metal hydroxides. Thus, the present invention also provides an advantageous continuous method of preparation of pure trans-4-aminomethylcyclohexane - 1-carboxylic acid. In this case, however, the metal ions contained in the reaction mixture to be treated is preferably eliminated beforehand by suitable means.

The following examples are given to more particularly illustrate the process of the invention:

Example 1

In 60 ml. of water was dissolved 10 g. of a mixture of trans- and cis-4-aminomethylcyclohexane-1-carboxylic acid containing 64% by weight of the trans isomer. To this solution was added a solution of 12.1 g. of p-toluenesulfonic acid in 10 ml. of water. The mixture was stirred, warmed, and allowed to stand and cooled with ice, whereupon 12.1 g. of brilliant plate crystals (M.P. 260–263° C.) were filtered and washed with cold water. The mother liquor was concentrated and allowed to stand whereupon 0.8 g. of plate crystals were separated, and these crystals were combined with the former crystals. The mother liquor was concentrated to about half volume and cooled whereupon 6.8 g. of needles (M.P. 177–178° C.) were separated.

The plate crystals were dissolved in warm water, and thereto was added about 30 ml. of weakly basic ion-exchange resin, Amberline IR–4B (OH). After the mixture was stirred sufficiently for 30 minutes, the filtrate was passed through a column of 20 ml. of the same ion-exchange resin. The eluate was concentrated and the residue was recrystallized from water or water-acetone to give 5.8 g. of trans-4-aminomethylcyclohexane-1-carboxylic acid having the melting point of 384–390° C. (with decomposition).

On the other hand, the needles were dissolved in water and treated with ion-exchange resin in the same manner to give 3.2 g. of cis-4-aminomethylcyclohexane-1-carboxylic acid having the melting point of 234–236° C. (with decomposition).

The two stereoisomers above obtained agreed well in their characteristics with the authentic samples.

Example 2

In 60 ml. of water was dissolved 10 g. of a mixture of trans- and cis-4-aminomethylcyclohexane-1-carboxylic acid containing about 50% by weight of the trans-isomer. To this solution was added a solution of 6.95 g. of p-toluenesulfonic acid in 7 ml. of water. The mixture was stirred, warmed, and allowed to stand overnight whereupon 8.8 g. of separated crystals were obtained. The mother liquor was concentrated to about 30 ml. and cooled with ice to obtain 2 g. of the separated crystals. These crystals were combined and recrystallized from water whereupon the melting point thereof was raised to 261–263° C.

The crystals and the filtrate were treated with the ion-exchange resin in the same manner as in Example 1 to give respectively free trans- and cis-4-aminomethylcyclohexane-1-carboxylic acid. Thus 4.5 g. of pure trans stereoisomer having the melting point of 385–390° C. (with decomposition) and pure cis stereoisomer having the melting point of 234–236° C. (with decomposition) were obtained.

Example 3

10 g. of a mixture of trans- and cis-4-aminomethylcyclohexane-1-carboxylic acid containing about 65% by weight of the trans-isomer was treated in the same manner as in Example 1, and 12.3 g. of p-toluenesulfonate of the trans stereoisomer and 6.4 g. of p-toluenesulfonate of the cis stereoisomer were obtained. The p-toluenesulfonate of the trans stereoisomer was dissolved in warm water, and the solution was rendered alkaline by the addition of a solution of 4.0 g. of triethylamine in ethanol. The mixture was stirred sufficiently, and thereto was added benzene. The benzene layer was removed and the water layer was concentrated. The residue was recrystallized from water-acetone to give 5.8 g. of trans-4-aminomethylcyclohexane-1-carboxylic acid having the melting point of 384–390° C. (with decomposition).

The p-toluenesulfonate of the cis stereoisomer was treated in the same manner to give 3.1 g. of cis-4-aminomethylcyclohexane-1-carboxylic acid.

Example 4

10 g. of a mixture of trans- and cis-4-aminomethylcyclohexane-1-carboxylic acid containing about 64% by weight of trans-isomer was treated in the same manner as in Example 1, and 11.8 g. of p-toluenesulfonate of the trans stereoisomer and 6.5 g. of p-toluenesulfonate of the cis stereoisomer were obtained. The p-toluenesulfonate of the trans stereoisomer was dissolved in warm water, and the solution was combined with 3.7 g. of cyclohexylamine was added and stirred sufficiently. The solution was concentrated to dryness and the residue was treated with dichloroethane. The dissolved p-toluenesulfonate of cyclohexylamine was removed, and the insoluble free trans stereoisomer was recrystallized from water-acetone to give 5.6 g. of trans-4-aminomethylcyclohexane-1-carboxylic acid having the melting point of 385–390° C. (with decomposition).

The p-toluenesulfonate of the cis stereoisomer was treated in the same manner as in Example 1 to give 3.2 g. of cis-4-aminomethylcyclohexane-1-carboxylic acid having the melting point of 234–236° C. (with decomposition).

Example 5

In an autoclave, 7.8 g. (0.04 mole) of 4-acetoamidomethylbenzoic acid was dissolved in an aqueous solution prepared by dissolving 1.6 g. (0.04 mole) of sodium hydroxide in 30 ml. of water. In this solution, was suspended 2 g. of Raney-nickel catalyst, and the suspension was shaken for about 2.5 hours at 175° C. in an atmosphere of hydrogen, the initial pressure of which is 87 atmospheric pressure (at room temperature) thereby the theoretical amount of hydrogen was absorbed. After cooling 1.76 g. (0.044 mole) of sodium hydroxide was added to the filtrate obtained by filtration of the catalyst, and the mixture was heated at 200° C. for 8 hours in an autoclave.

After cooling, 23.6 g. of p-toluenesulfonic acid is added to the reaction mixture and the mixture was allowed to stand whereupon colorless plate crystals were precipitated. The crystals were filtered and washed with cool water to give 4.42 g. of crystals having the melting point of 258–260° C. The crystals were dissolved in 50 ml. of warm water and passed through a column of 16 ml. of weakly basic ion-exchange resin, Amberlite IR–4B (OH−), thereby p-toluenesulfonic acid was adsorbed in the column. The eluate was concentrated and the residue was recrystallized from acetone-water to give 1.98 g. of trans-4-aminomethylcyclohexane-1-carboxylic acid having the melting point of 385–390° C. (with decomposition). p-Toluenesulfonic acid can be recovered by pouring 3% hydrochloric acid into the column followed by concentrating the eluate.

Example 6

In 50 ml. of warm water was dissolved 6.60 g. of crystals of p-toluenesulfonate of trans-4-aminomethylcyclohexane-1-carboxylic acid obtained by treating 6.1 g. of 4-acetamidomethylbenzoic acid in the same manner as in Example 5. The solution was passed through a warmed column of Amberlite IR–120B(H+, 1.1 x 14.0 cm.). The column was further washed with water until the elution of p-toluenesulfonic acid ceased. Next, 5% ammonia water was poured into the column until the Ninhydrin Reaction of the eluate became negative, and the ammoniacal eluate was collected and concentrated. The residue was dissolved in water and acetone was added to precipitate 2.94 of crystals of trans-4-aminomethylcyclohexane-1-carboxylic acid having the melting point of 385–390° C. (with decomposition).

Example 7

In 20 ml. of water were dissolved 2.0 g. of a mixture of trans- and cis-4-aminomethylcyclohexane-1-carboxylic acid containing about 60% by weight of the cis-isomer and 0.76 g. of sodium hydroxide. In an autoclave, the solution was heated at 200° C. for 8 hours. After cooling, the reaction mixture was passed through a column (1.1 x 23.0 cm.) of strongly acidic ion-exchange resin (H type, Diaion SK–1B). Then 4-aminomethylcyclohexane-1-carboxylic acid was eluated with 5% ammonia water and the eluate was concentrated. To the neutral concentrated solution was added a solution of 2.4 g. of p-toluenesulfonic acid in 2 ml. of water, and the mixture was warmed under agitation. The mixture was allowed to stand whereupon 3.15 g. of crystals were precipitated.

The crystals were filtered, washed with cold water to give crystals having the melting point of 261–263° C. The crystals were dissolved in about 35 ml. of warm water and passed through a column of 10 ml. of previously warmed strongly acidic ion-exchange resin (H type, Diaion SK–1B). The column was further washed with water until the elution of p-toluenesulfonic acid ceased. Thereafter, 5% ammonia water was passed through the column until the Ninhydrin Reaction of the eluate became negative and the ammoniacal eluate was collected and concentrated. The residue was dissolved in water and acetone was added thereto to precipitate 1.5 g. of the crystals of trans-4-aminomethylcyclohexane-1-carboxylic acid having the melting point of 385–390° C. (with decomposition).

While the invention has been described by the use of several specific examples, they do not limit the invention as variations in the details may be made in the details thereof. For instance, the sulfo compound may have more than one sulfonic group. The p-toluene group may be replaced by its isomers and mixtures of isomers are applicable. Other aromatic radicals may be used, such as benzene and polyalkyl substituted benzenes wherein the alkyl radical has 1 to 3 carbon atoms. Naphthalene sulfonic acids may also be used. These and other changes may be made within the scope of the appended claims.

What is claimed is:

1. A process for separating the isomer trans- from the isomer cis-4-aminomethylcyclohexane-1-carboxylic acid from a mixture thereof which comprises treating the mixture in water with p-toluenesulfonic acid to form sulfonates of said isomers, separating two p-toluenesulfonates from each other utilizing the difference in solubilities thereof, and liberating trans-4-aminomethylcyclohexane-1-carboxylic acid from the separated p-toluenesulfonate of said trans isomer.

2. A process according to claim 1 in which the liberation of trans-4-aminomethylcyclohexane-1-carboxylic acid from the p-toluenesulfonate thereof is carried out by treating an aqueous solution of said p-toluenesulfonate with an ion-exchange resin selected from the group consisting of strongly acidic ion-exchange resin and weakly basic ion-exchange resin.

3. A process according to claim 1 in which the liberation of trans-4-aminomethylcyclohexane-1-carboxylic acid from the p-toluenesulfonate thereof is carried out by treating an aqueous solution of said p-toluenesulfonate with an organic amine selected from the group consisting of cyclohexylamine, dicyclohexylamine and triethylamine.

4. A process for separating the isomer trans- from the isomer cis-4-aminomethylcyclohexane-1-carboxylic acid in a mixture thereof which comprises treating the mixture in a medium of water with water miscible organic solvent with p-toluenesulfonic acid to form sulfonates of said isomers, separating said two p-toluenesulfonates from each other utilizing the difference in solubilities thereof, and liberating trans-4-aminomethylcyclohexane-1-carboxylic acid from the separated p-toluenesulfonate of trans isomer.

5. A process according to claim 4 in which the water miscible organic solvent is taken from the class consisting of methanol, ethanol, propanol and acetone.

6. A process according to claim 4 in which the liberation of trans-4-aminomethylcyclohexane-1-carboxylic acid from the p-toluenesulfonate thereof is carried out by treating an aqueous solution of said p-toluenesulfonate with an ion-exchange resin selected from the group consisting of strongly acidic ion-exchange resin and weakly basic ion-exchange resin.

7. A process according to claim 4 in which the liberation of trans-4-aminomethylcyclohexane-1-carboxylic acid from the p-toluenesulfonate thereof is carried out by treating an aqueous solution of said p-toluenesulfonate with an organic amine selected from the group consisting of cyclohexylamine, dicyclohexylamine and triethylamine.

References Cited

Chem. Abstracts, vol. 36, 1942.
Chem. Abstracts, vol. 37, 1943.
Plummer, W. D., Dissertation Abstracts, vol. 16, 2324–5 (1956).
Patel et al., American Pharm. Assoc. J., vol. 42, 321 (1956).
Shimizu, M. et al., Chem. Pharm. Bull. (Tokyo) 13(8) 1012–14 (1965).
Chem. Abstracts, vol. 59, 1963.
Chem. Abstracts, vol. 63, 1965.

LORRAINE A. WEINBERGER, *Primary Examiner.*

PAUL J. KILLOS, *Assistant Examiner.*